United States Patent [19]
Reddaway

[11] 3,811,038
[45] May 14, 1974

[54] PSEUDO-RANDOM NUMBER GENERATORS

[75] Inventor: Stewart Fiddian Reddaway, Baldock, England

[73] Assignee: International Computers Limited, London, England

[22] Filed: Sept. 13, 1972

[21] Appl. No.: 288,794

[30] Foreign Application Priority Data
Sept. 15, 1971 Great Britain .................... 42902/71

[52] U.S. Cl. .................................. 235/152, 331/78
[51] Int. Cl. .............................................. G06f 7/38
[58] Field of Search ............... 235/152, 168; 331/78

[56] References Cited

UNITED STATES PATENTS

| | | | |
|---|---|---|---|
| 3,456,208 | 7/1969 | Ratz | 331/78 |
| 3,548,174 | 12/1970 | Knuth | 235/152 |
| 3,614,399 | 10/1971 | Linz | 235/152 |
| 3,706,941 | 12/1972 | Cohn | 331/78 |

OTHER PUBLICATIONS

S. B. Matthews, "Generation of Pseudorandom Noise Having a Gaussian Spectral Density", IEEE Trans. on Computers. Apr. '68 pp. 382–385.

R. J. Harding "Generation of Random Digital Numbers with Specified Probability Distributions," Radio & Electronic Engineer, June '68 pp. 369–375.

*Primary Examiner*—Eugene G. Botz
*Assistant Examiner*—David H. Malzahn
*Attorney, Agent, or Firm*—Hane, Baxley & Spiecens

[57] ABSTRACT

A pseudo-random number generator produces a substantially Gaussian distribution of output numbers from a succession of uniform random numbers. In each cycle uniform random numbers are produced and applied to an adder operative to form cumulative sums. A counter is responsive to carry signals from the adder and the outputs of the adder and counter are combined to form an output pseudo-random number. The number of permitted adding operations is preset.

7 Claims, 2 Drawing Figures

EXCLUSIVE OR GATE.

PSEUDO-RANDOM NUMBER GENERATORS

BACKGROUND OF THE INVENTION

The present invention relates to pseudo-random number generators.

Some users of data processing equipment frequently require large numbers of random numbers. They find it useful for many applications to generate pseudo-random sequences of numbers which are sufficiently random to be useful but have the advantage that they are reproducible. Such pseudo-random numbers generally have a known distribution over their range say 0–4096. Perhaps the most important such distribution is the Gaussian distribution represented by the well-known 'bell' curve. While it may be desired to produce a Gaussian distribution of pseudo-random numbers, there will, in practice, tend to be errors in the accuracy with which this theoretical distribution is approached. One general aim, therefore, of pseudo-random number generators is to minimize such errors as far as possible.

As mentioned above, it is desirable to produce a sequence of numbers that is reproducible to allow future use, while at the same time producing a sequence that does not repeat itself after a relatively low number of numbers are generated. Such sequences of pseudo-random numbers can be produced by software on a general purpose digital computer. This however, tends to occupy a large amount of computer time and it is more economical to produce a separate pseudo-random number generator, particularly if low cost standard components may be employed. One problem with hardware lies in the fact that simple systems tend to be slow in operation in order to produce a particular distribution of numbers while higher operating speeds may be achieved at the expense of complex and more costly systems.

Pseudo-random number generators can be based on the use of chain codes comprising sequences of pulses having random properties. These can be generated using a shift register and a feedback to the first register stage from other stages via an Exclusive-OR gate. Appropriate choice of stages to feedback enables the length of the pulse sequence to be maximized before it repeats. The resulting pulse sequence still has some regularities and these can be reduced by combining sequences from two different such shift registers in an Exclusive-OR gate. Embodiments of this invention use such shift register techniques to generate binary numbers of which the digits are formed from the contents of selected shift register stages. The digits of such numbers ideally have an equal chance of being 1 or 0 as required for uniform random numbers. In practice, the deviation from true uniform random numbers is tolerably small when the rules set out later are followed using, for each digit, a selected pair of stages one from each of two different shift registers.

SUMMARY OF THE INVENTION

According to the invention a pseudo-random number generator comprises an adder, means for causing the adder to successively add a predetermined number of uniform random numbers, and a counter for counting the number of carry signals from the adder, the outputs of the counter and the adder constituting portions of an output pseudo-random number.

The pseudo-random numbers produced have an approximately Gaussian distribution. For uniform random numbers formed by combining outputs from stages of a single shift register using Exclusive-OR gates, one for each digit, the resulting Gaussian distribution can be distorted towards low numbers because there is a tendency for 0's to be, on occasions, excessively bunched together in a shift register sequence. This tendency is very much less when two different shift registers are used and so is much to be preferred.

INTRODUCTION TO DRAWINGS

Pseudo-random number generating apparatus embodying the present invention will now be described, by way of example with reference to the accompanying drawing, in which, FIG. 1 shows a diagrammatic view of the random number generator of the present invention, and, FIG. 2 shows a schematic version of an Exclusive-OR gate as employed in FIG. 1.

DESCRIPTION OF PREFERRED EMBODIMENT

Figure 1:
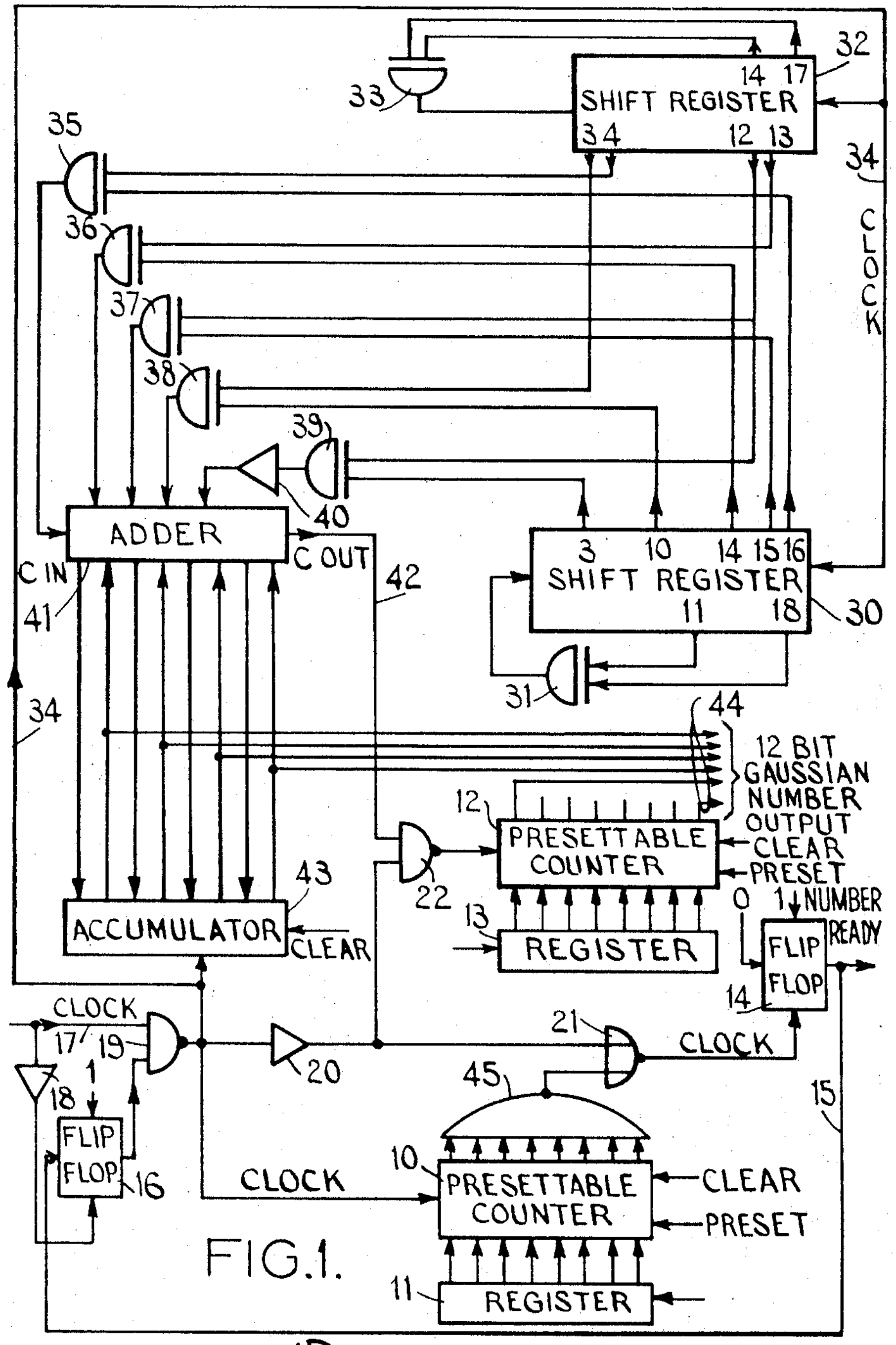

Referring now to FIG. 1, there is shown a presettable counter 10 having CLOCK, CLEAR and PRESET inputs. The counter 10 is loaded in parallel by means of a register 11 which is loaded in serial manner. The output of the counter 10 is applied to a NAND gate 45 connected via a NOR gate 21 to a flip-flop device 14, the output of which is connected via line 15 to a further flip-flop 16. A second input to a flip-flop device 16 is provided by an inverter 18 which inverts an incoming clock signal on line 17. The output of the flip-flop device 16 is applied to a NAND gate 19 along with the clock signal on line 17, the output of a NAND gate 19 being applied through an inverter 20 to the NOR gate 21.

A second presettable counter 12 is loaded in a parallel fashion from register 13 by means of the PRESET input. Alternatively, it can be set to zero by means of the clear input. As will be discussed subsequently, the outputs of counter 12 will form a portion of the output random binary number.

Two shift registers 30 and 32 each receive CLOCK signals from the output of the NAND gate 19 over line 34 and each have several pick off points from which are produced uniform random numbers and feedback signals. Register 30 is an 18 stage shift register with pick off points at stages 3, 10, 14, 15 and 16 for producing binary signals which are used to produce uniform random numbers while pick off points at stages 11 and 18 apply binary signals to Exclusive-OR gate 31 which applies an input to the lowest stage of register 30. Register 32 is a seventeen stage shift register having pick off points at stages 14 and 17 to provide binary feedback signals via an Exclusive-OR gate 33 and pick off points at stages 3, 4, 12 and 13 to provide binary signals which are used to produce uniform random binary numbers.

Five Exclusive-OR gates 35-39 have, as inputs, the outputs picked off from stages of shift register 30 and 32 and not applied to the feedback Exclusive-OR gates 31 and 33. The outputs of gates 35–39 constitute good five digit uniform random numbers and are applied to a four stage adder 41 the output of gate 35 being applied to the carry in position of adder 41 to appropriately centre the distribution. Also, for reasons to be discussed subsequently, the output of gate 39 is inverted by inverter 40 prior to being applied as the most significant stage of the adder 41. The stage outputs of adder 41 are connected to an accumulator register 43 whose stage outputs are returned to the same stages of the adder 41. The outputs of the register 43 also are taken to form a portion of the output random number along with the outputs of counter 12. Also, the carry-out line of the adder 41 provides signals over line 42 via NAND gate 22 to the second counter 12. The inverter CLOCK signal from the inverter 20 is also applied to a second input of the NAND gate 22.

Figure 2:
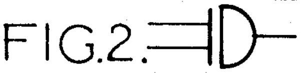

FIG. 2 serves only to define the Exclusive-OR gate symbol employed in FIG. 1.

For effective operation of the random number generator, the pick off points of shift registers 30 and 32 are connected to the Exclusive-OR gates 35–39 in accordance with certain rules to give good uniform random numbers. These rules are (1) that the two inputs to each Exclusive-OR gate 35, 36, etc., must comprise one from each of the shift registers 30 and 32, (2) that if all patterns of 0's and 1's on the inputs of Exclusive-OR gates are permitted, all combinations of output patterns must be possible, and (3) no two of the Exclusive-OR gates 35–39 should have their inputs from shift register stages whose significances differ by the same amount. The particular reasons for these rules will be apparent when considered in light of the object of producing uniform random numbers. For example, rule (1) allows the use of only one Exclusive-OR gate per bit of a random number, thereby minimizing overall costs, and contributes to improved randomness as the inputs of each gate 35–39 must come from different ones of the shift registers 30 and 32. Rule (2 ) ensures that, at any moment in time, each bit produced is independent of the others. A consequence of rule (2) is that the number of bits produced is limited by the total number of shift register stages. Rule (3) prevents one sequence of inputs to Exclusive-OR gates 35-39 from being identical to another sequence except for a time shift of several pulses. Although the three rules limit the possible combinations in which inputs to Exclusive-OR gates may be taken from stages of shift registers 30 and 32, they result in a sequence of highly random numbers.

In operation, an eight bit number, preferably between 0 and 191 is loaded serially into the register 11. As will become clear, this will allow between 256 and 65 additions of uniform random numbers. Upon the occurrence of a PRESET signal, this number is loaded in parallel into the first presettable counter 10, and determines the number of additional operations allowed before the counter reaches its maximum and a 12 bit Gaussian number output is indicated as ready by the flip-flop 14. The CLOCK signal on line 17 is inverted by inverter 18 and is applied as a low level input to flip-flop 16 which in turn provides a high level input to NAND gate 19. With the output of NAND gate 19 low, inverter 20 produces an enabling signal to NOR gate 21 which, as long as the number of clock pulses has not reached the number preset in counter 10, causes flip-flop 14 to give a 1 or high signal over line 15. This signal in turn causes flip-flop 16 to give a low level signal to unlock NAND gate 19 which passes the next CLOCK pulse to line 34 and shift register 30 and 32 as well as to presettable counter 10. Thus, each clock pulse is added to the total of clock pulses in counter until the preset number in counter 10 is detected by NAND gate 45. At this latter point, the lower input of NOR gate 21 goes low and a low level output or 0 is produced by flip-flop 14 to cause, via flip-flop 16, NAND gate 19 to cut off CLOCK pulses to indicate that a sequence has ended and that a 12 bit Gaussian number output is ready for further use.

The application of a CLOCK pulse on line 34 to shift register 32 causes signals representing the states of stages 14 and 17 to be applied to the Exclusive-OR gate 33. If one of the stages 14 to 17 is a binary 1 and the other stage of binary 0, a binary 1 is produced by gate 33 and entered into the lowest stage of shift register 32. Also, with CLOCK pulses being continuously applied the binary state of stages, 3, 4, 12 and 13 are fed to Exclusive-OR gate 35–39 as one input to each gate. in a similar manner, the binary states of stages 3, 10, 14, 15 and 16 of shift register 30 are applied to gates 35-39, with the feedback via Exclusive-OR gate 31 being taken from stages 11 and 18.

It will be noted that one input to each Exclusive-OR gate 35–39 is taken from an output of shift register 30 while the other input is taken from shift register 32. Also, in accordance with rule (3), it will be seen that the difference in stages of inputs to gates 35–39 is not equal. For example, the inputs to Exclusive-OR gate 36 are taken from stage 14 of register 30 and 13 of register 32 for a difference of 1. The inputs to gate 35 are taken from stage 16 of register 30 and stage 4 of register 32 for a difference of 12. In the case of any other of Exclusve-OR gates 37–39, the 'difference' in inputs is neither 1 nor 12.

Depending on the pattern of 1's and 0's in shift registers 30 and 32 at any particular time, a particular pattern of 1's and 0's, constituting, in binary form, a uniform random number will be applied to the adder 41. By employing an accumulator register 43, in known manner, the binary number applied to adder 41 is totalled with binary numbers previously applied. As the counter 10 is an eight bit counter, a maximum of 255 such binary numbers may be added together. The numbers resulting from such successive additions of uniform random numbers have a substantially Gaussian distribution as desired and so constitute an appropriate pseudo-random sequence.

It will be realized that by applying a 4 bit binary number to adder 41, numbers in the range of 0–15 are added together each clock pulse. The true average for these numbers is 7½, and it may be more desirable to have an integer as the average number, and thus the centre of the distribution produced by successive adding operations. This is achieved by applying the output of Exclusive-OR gate 35 to the carry-in terminal of the adder 41 so that whenever this bit is a binary 1, i.e., about one-half of the time, the numbers 1–16 are applied to adder 41. This has the effect of having an average of 7½ half of the time and an average of 8½ the other half of the time, giving an overall average of 8 which is an integer as desired.

Continuing with the description of the operation of the system, a line 42 receives signals from the carry-out terminal of the adder 41 and applies them via NAND gate 22 to the second counter 12. The NAND gate 22 will be shut off during application of CLOCK signals by inverter 20 and after the shift and add operations have been completed, and any transients have settled NAND gate 22 will pass the carry-out signal on line 42 to the presettable counter 12. As many as 255 carry out signals may occur, and the binary states of the stages of counter 12 will provide 8 bits of a pseudo-random number also having a Gaussian distribution. These 8 bits can be combined with the state of the 4 bits of adder 41 at the end of a sequence to produce a final 12 bit Gaussian pseudo random number on lines 44.

In the present system, it has been found that by employing two maximum length feedback shift registers 30 and 32 and respective Exclusive-OR gates 31 and 33, there is still a slight tendency in the final Gaussian type distribution for the lower part of the distribution to have too many zeros while the upper "tail" of the distribution is cut off too soon. In the event of a large portion of either shift register 30 and 32 being occupied by all 0's and all 1's, the output of the respective Exclusive-OR gate 31 or 33 will be a zero. Thus, there is a tendency that once a string of 0's, for example, occurs in one shift register, the feedback will produce still more 0's rather than compensate for them. The result then is that too many 0's may appear on lines 44 and that too many low numbers occur at the low end of the distribution. This also, of course, means that too few numbers are produced at a high end of the distribution (for a lack of 1's) with the resulting distribution being somewhat distorted.

It has been found that this tendency of the Gaussian distribution can be substantially eliminated by applying the output of Exclusive-OR gate 39, which is the most significant bit applied to adder 41, through an inverter 40. Since the most significant bit has a 'weight' equal to the combined 'weights' of the other bits of adder 41, any tendency of the other bits toward 0's is countered by inverting the most significant bit. In this way, a more accurate representation of a Gaussian distribution is obtained for pseudo-random numbers represented in binary form on lines 44.

In certain circumstances it is desirable to be able to offset the 'mean' of the Gaussian distribution. One reason for offsetting the mean is to allow standard deviations to be varied without extra multiplication operations. If, for example, the distribution of pseudo-random numbers on lines 44 is from 1–4096 with a mean of say 2048, it is possible to offset the mean by presetting counter 12 to a particular figure. An overflow of numbers at the ends of the distribution should be taken into consideration of such an offset is produced.

The illustrated apparatus provides a good Gaussian distribution of pseudo-random numbers, with each sequence, or particular distribution, being reproducible by setting the initial contents of the shift registers 30 and 32 and the counter 10. While the shift registers 30 and 32 are shown as 18 and 17 bit devices, respectively, it will be appreciated that other bit-length shift register may be employed. Also adder 41 and accumulator register 43 need not be 4 bit devices but may have other bit lengths in dependence on the desired length of output number. While presettable counters 10 and 12 and corresponding registers 11 and 13 have been described as 8 bit devices, other bit length devices may be employed. Also, flip-flops 14 and 16 may be "D-type" flip-flop with the 0 applied as the D input.

I claim:

1. A pseudo-random number generator including an adder; means operative to apply a predetermined number of multi-digit uniform random numbers in succession to the adder; an accumulator for storing a cumulative sum; the adder being effective to add each multi-digit random number in turn to the cumulative sum stored in the accumulator to produce a sum signal and carry signal; a counter operative in response to the carry signals to generate output signals; the output signals and the sum signals constituting portions of an output pseudo-random number.

2. A generator according to claim 1 wherein the adder includes a plurality of stages and a carry-in terminal, the number of stages being one less than the number of digits in each of said multi-digit uniform random numbers; and said means operative to apply random numbers to the adder includes a line connected to said carry-in terminal for applying the least significant digit of each said uniform random number to the adder.

3. A generator according to claim 1 wherein said means operative to apply random numbers to the adder includes a plurality of lines, for applying respective digits of each said uniform random number to the adder, one of said lines including an inverter.

4. A generator according to claim 3 wherein the digital significance of the digit of the uniform random number applied by the line which includes the inverter is equal to the sum of the digital significances of all the other digits of that uniform random number applied to the adder.

5. A generator according to claim 1 comprising a register for presetting the counter in accordance with the contents of the register to effect offsetting the mean of the resulting distribution of pseudo random numbers.

6. A generator according to claim 1 wherein said means operative to apply random numbers to the adder includes a further counter presettable to determine the number of said uniform random numbers applied to the adder.

7. A generator according to claim 1 wherein said means operative to apply random numbers to the adder includes two shift registers each with exclusive -OR feedback from selected stages to their input stages, and a plurality of exclusive-OR gates for combining the contents of pairs of shift register stages, each pair consisting of a stage from each shift register, to form said uniform random numbers.

* * * * *